June 2, 1953  E. W. MILLER  2,640,397
REVERSING FEED GEAR SHAPING MACHINE
Filed Aug. 2, 1945  10 Sheets-Sheet 5

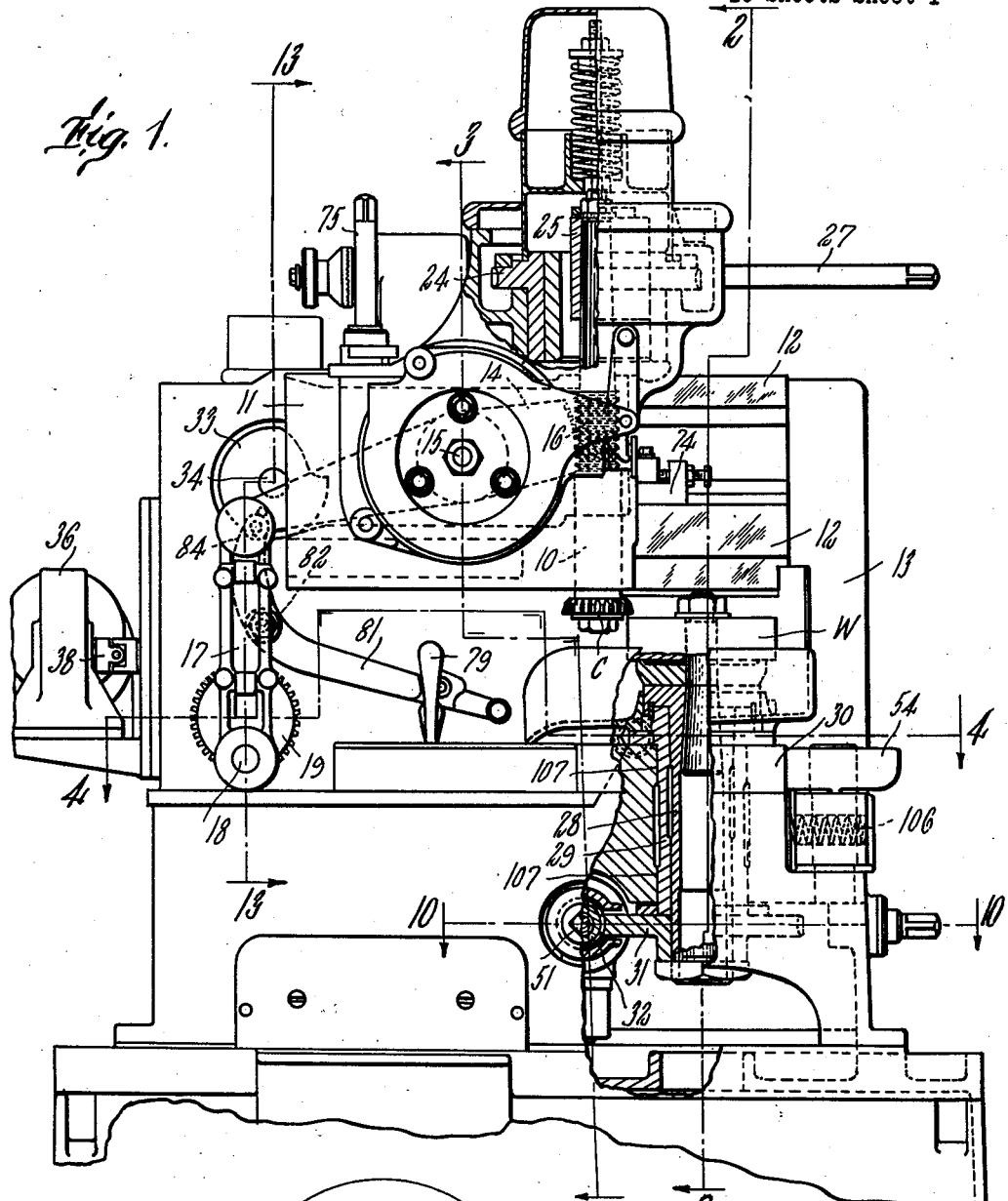
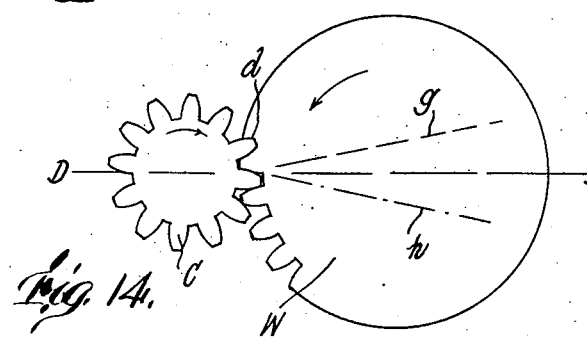

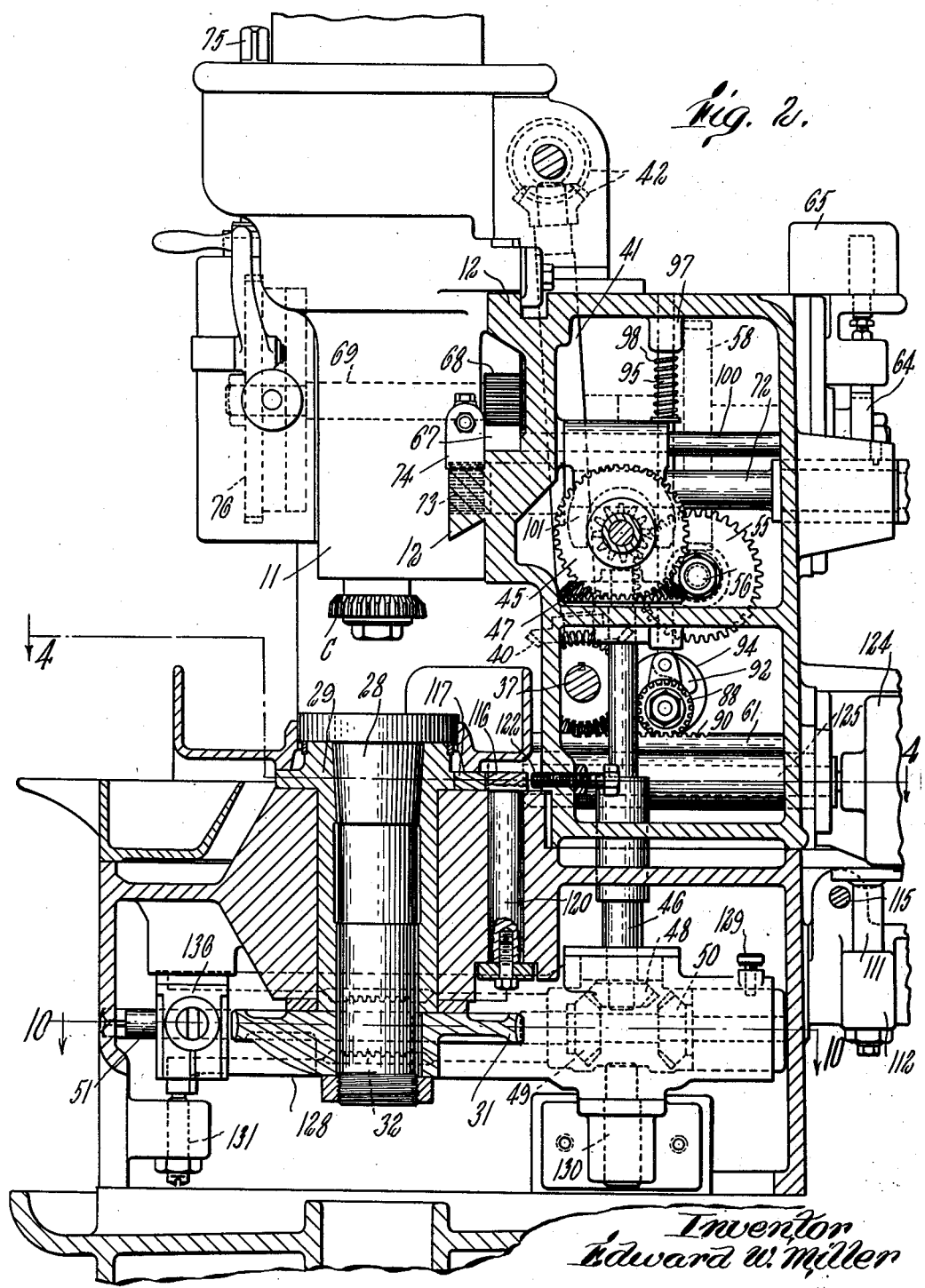

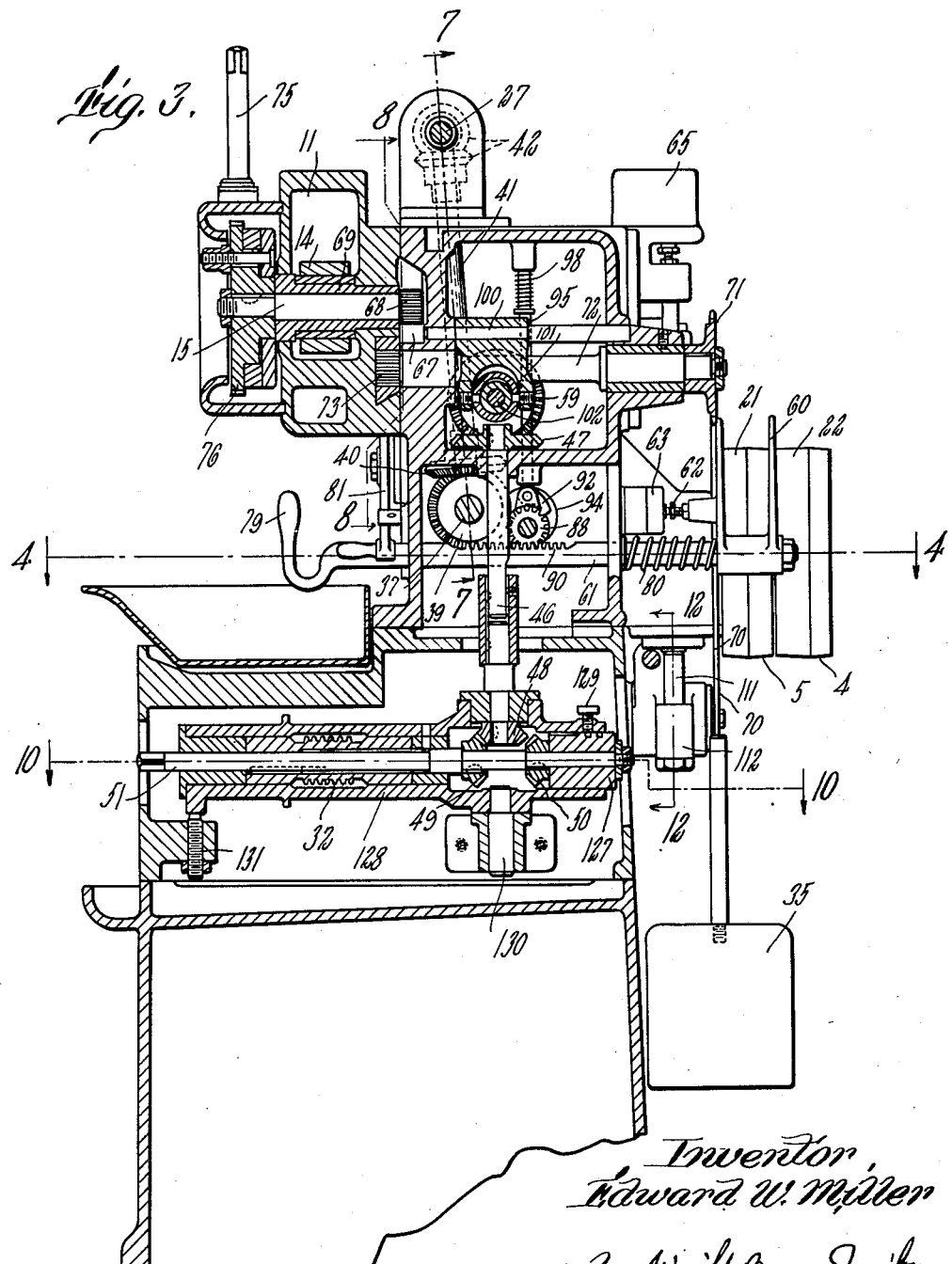

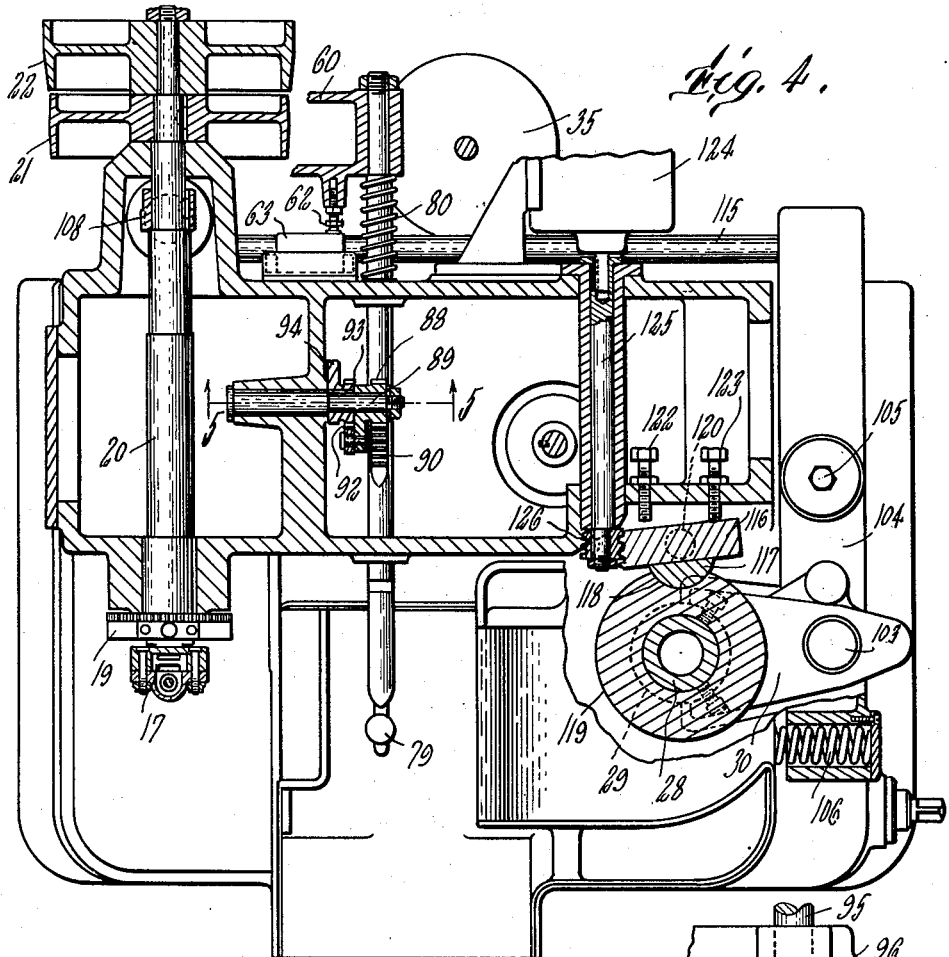

Inventor
Edward W. Miller

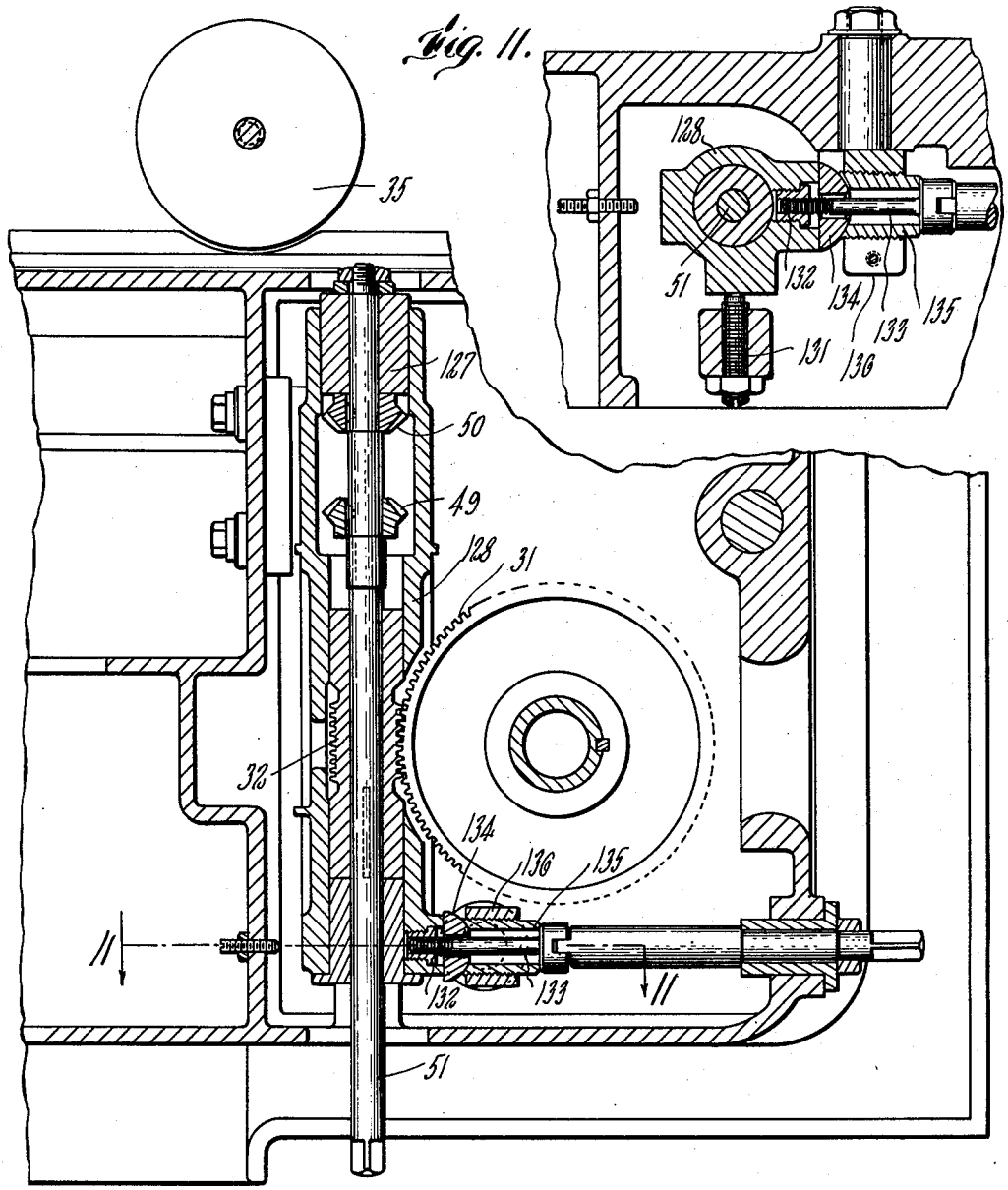

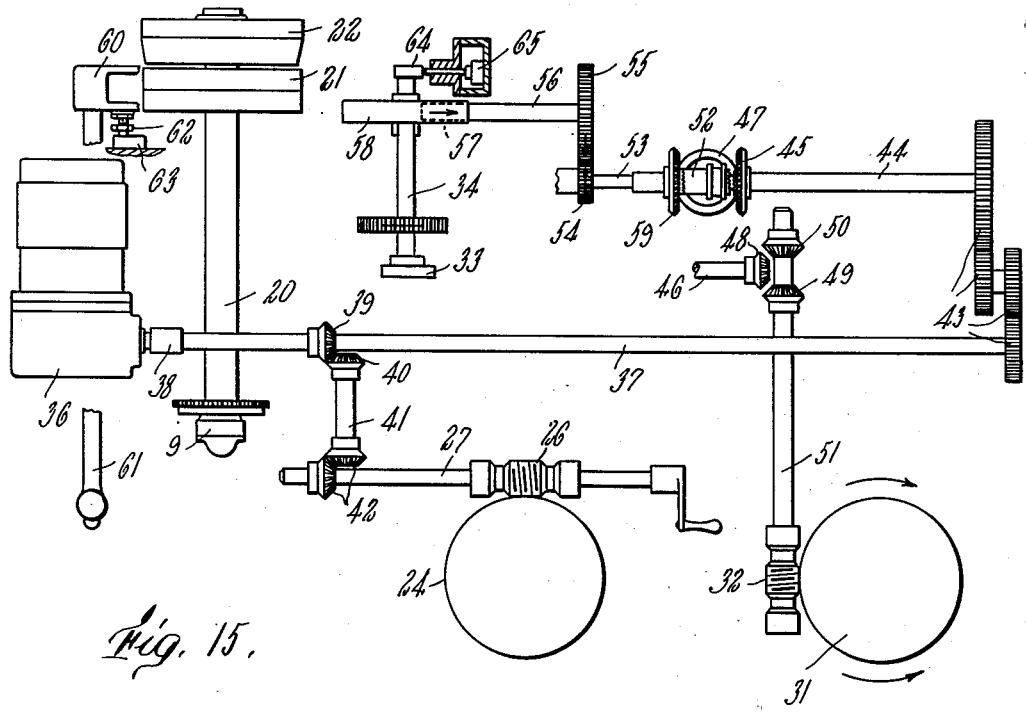

Inventor
Edward W. Miller

Patented June 2, 1953

2,640,397

UNITED STATES PATENT OFFICE 2,640,397

REVERSING FEED GEAR SHAPING MACHINE

Edward W. Miller, Springfield, Vt., assignor to The Fellows Gear Shaper Company, Springfield, Vt., a corporation of Vermont Application August 2, 1945, Serial No. 608,415

9 Claims. (Cl. 90—7)

The present invention relates to the art of generating and cutting gears by the use of a planing cutter having teeth similar to gear teeth but formed with cutting edges on one end and side clearance back from the cutting edges. The cutters referred to are the well known Fellows gear shaper cutters, illustrations of which are given in the patent of E. R. Fellows No. 676,226, June 11, 1901. The main object of the invention is to increase the life of the cutter by equalizing the wear on both side edges and the tip edge of the cutter teeth.

Heretofore in the practice of generating gears by reciprocation of a gear shaper cutter and simultaneous rotation of the cutter and work, the cutter has been rotated always in the same direction when cutting a number of gears in succession, and all of the gear blanks have been rotated in the same direction, which is opposite to the rotation of the cutter when external gears are generated, and the same as that of the cutter when generating internal gears. This has resulted in the cutting edges at the advancing side of the cutter teeth being subjected to much more severe duty and wear than the trailing edges and becoming so dull as to require resharpening while the trailing edges are still sharp enough to perform satisfactory cutting action. Sharpening is effected by grinding away the end faces of the cutter teeth and adjacent end surface of the cutter. When repeated grindings have shortened the teeth to the point where they are not strong enough to be depended on, the useful life of a cutter is ended.

The present invention comprises the method of equalizing wear on both side edges of the cutter teeth by reversing the direction of its rotation, and that of the spindle which carries the work gears, from time to time, so that the opposite side edges become alternately the leading edges; and timing the reversals with respect to the cutting action in such manner that substantially or nearly equal numbers of cutting strokes are made while rotation in each direction is going on. Preferably such reversals are effected at the commencement of the cutting action on each new blank work piece, and certain features of the machine are correlated with the procedure of so doing. However, in the broad aspects of the invention, reversals may be made at other intervals, for instance after two or more gears have been cut.

The invention further comprises novel combinations and organizations in gear shaping machines by which reversals of cutter and work spindle rotations are effected at the prescribed times. It comprises, still further, automatic reversing means for controlling the direction of back off between the cutter and work to avoid rubbing contact during the non cutting strokes. In some cases, depending on the number and form of the cutter teeth and the dimensions of the gear blank, interference occurs between the cutter teeth and work at one or more points when the backing off movement takes place on the line of centers of cutter and work piece, and in such cases the direction of back off is inclined at a suitable small angle to the line of centers; wherefore, when the direction of rotation is reversed, the back off path must be inclined at an opposite, and generally an equal, angle to the line of centers, as otherwise the interference difficulty would be intensified. The invention also includes means for effecting reversal of the drive for the depth feeding means relative to the cutter rotation, when that rotation is reversed, in those machines which are equipped with depth feeding means and in which the invention is embodied.

A machine effective for accomplishing the objects and containing the principles stated and implied in the foregoing introduction, and constituting one illustrative embodiment of the invention, is described in the following specification, and shown in the accompanying drawings, in which, Fig. 1 is a front elevation of the machine with parts broken away and shown in section;

Fig. 2 is a vertical cross section on line 2—2 of Fig. 1, as seen from the right hand side;

Fig. 3 is a vertical cross section taken on line 3—3 of Fig. 1, looking in the direction of the arrows on that line;

Fig. 4 is a horizontal section taken on line 4—4 of Figs. 1, 2 and 3;

Fig. 5 is a section taken on line 5—5 of Fig. 4 showing a detail of mechanism;

Fig. 6 is an elevation of the mechanism shown in Fig. 5, as seen from the line 6—6 of the latter figure;

Fig. 10 is a horizontal section taken on line 10—10 of Figs. 1, 2 and 3;

Fig. 11 is a detail sectional view taken on line 11—11 of Fig. 10;

Fig. 14 is a diagram showing a cutter in operation on a gear blank and showing an illustration of backing off interference;

Fig. 15 is a schematic layout of the mechanical parts of the machine;

Like reference characters designate the same parts wherever they occur in all the figures.

Figure 17:
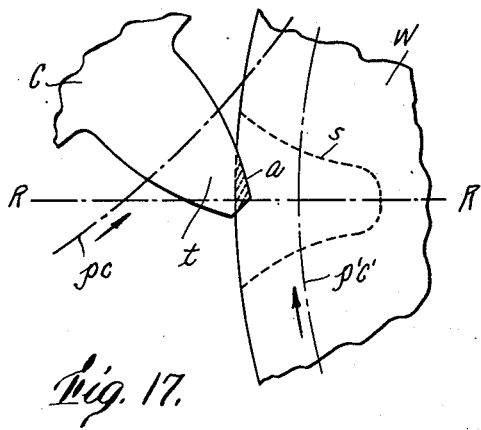
Figs. 17, 18, 19 and 20 are diagrams illustrating the nature of the cutting action performed by a cutter of the character referred to and the duty imposed on the cutting edges thereof.

In these drawings, a cutter of the standard gear shaper type is designated, wherever it occurs, by the reference character C; and the work piece, a gear blank, by the letter W. It will be convenient to describe first the duties imposed on the edges of the cutter in explaining the objects and utility of the invention. For this purpose reference is made to Figs. 17-22. These figures show one tooth of the cutter designated $t$, in a selected few of the many positions it occupies relatively to the work in generating and cutting out a single tooth space. In Fig. 17 the tooth $t$ is represented as taking the first cut on a blank, the location and form of the tooth space to be eventually finished being indicated by the dotted outline $s$. The broken line arcs $pc$ and $p'c'$ represent the pitch circles of cutter and work respectively, and the line RR represents the radius of the work piece through the center of the respective tooth space. It is assumed that the cutter and work rotate in the direction of the arrows applied adjacent to their respective tooth pitch circles. The shaded area $a$ indicates in a qualitative way the cut made on the first cutting stroke.

Figure 18:
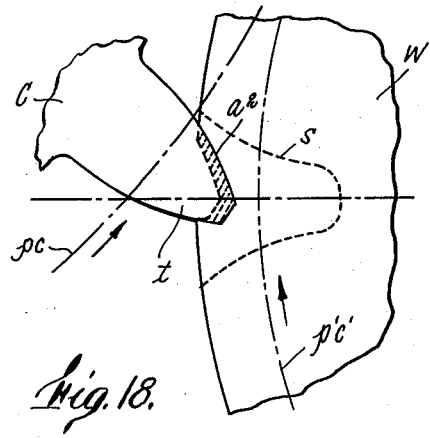
Figure 19:
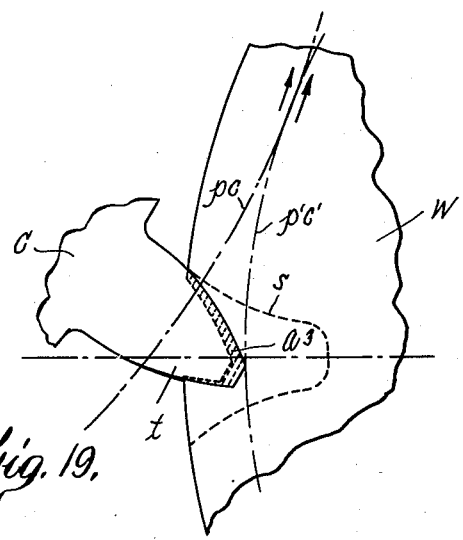
Figure 20:
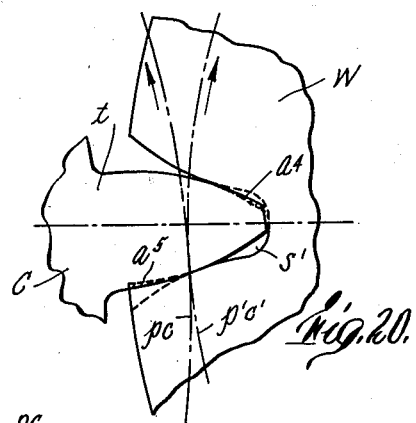

Fig. 18 shows the relative positions of the cutter tooth and work piece after they have rotated through a considerable angle about their respective centers. For convenience of comparison, these figures and those following show the work piece in the same position and represent the cutter tooth as though the cutter had been rolled in a planetary manner around the axis of the work. Actually both rotate about their respective axes without change of position (except for cutting reciprocation and backing off) but the cutting action and penetration of the cutter teeth into the work would be the same if either were revolved around the other. Here the shaded area $a^2$ represents the depth of the cut being taken when the cutter is in the position shown, the dotted boundary of that area representing the position of the cutter tooth when making the preceding cut. Fig. 19 shows the relative positions of cutter tooth and work at a somewhat later stage, and here the shaded area $a^3$ represents the depth of the cut being taken. Fig. 20 shows the condition at a considerably later stage, when the cutter tooth has passed slightly beyond the line of centers and has nearly completed the generation of the space in the work piece. When in this position the leading edge is cutting a chip represented by the area $a^4$ in the corner of the tooth space and the trailing edge is cutting a chip represented by the shaded area $a^5$ at and near the mouth of the space, the portion of that edge at and near the tip having previously completed the inner corner and fillet $s'$.

Figure 21:
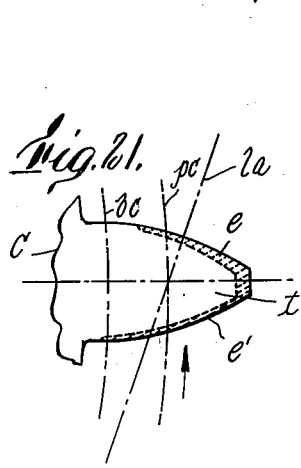
Figs. 21 and 22 are diagrammatic views of one of the teeth of the cutter showing a qualitative comparison of the duty imposed on the lateral cutting edges and tip edge when the generative or feeding rotation is performed in opposite directions.

Fig. 21 indicates by the shaded areas adjacent to the side edges and tip of the tooth, the integration of all the cuts made in the course of generating any tooth space. It will be noted that the depth of the shaded area adjacent to the leading edge $e$ of the tooth is greater than that of the area adjacent to the trailing edge $e'$. Actually the depths of individual cuts are much less than as indicated in these diagrams, for a cutter may take a great many strokes, in the order of scores or hundreds, in generating a single space in the work. But comparatively, these depth dimensions show that a greater amount of cutting is done by the leading edge than by the trailing edge. The facts thus indicated are supported by experience, and it has been found necessary to sharpen cutters before the trailing edges of the teeth have become dull.

Figure 22:
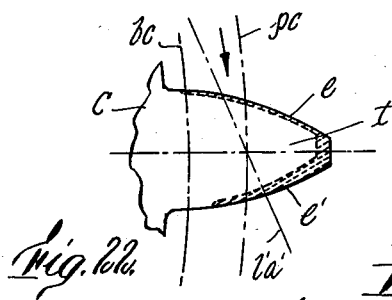

When the rotation of the cutter and work is reversed, the edge $e'$ of each tooth becomes the leading edge and sustains the greater amount of wear. This condition is shown in Fig. 22, wherein the arrow shows that the cutter has been rotated clockwise, whereas the rotation was counter-clockwise in the operations represented in Figs. 17–21. In Figs. 21 and 22 the arc $bc$ designates the base circle of the cutter tooth curves, the line $la$ is the line of action when rotating counter-clockwise and $l'a'$ is the line of action in the clockwise direction.

The invention includes both the method of reversing the direction of rotation at suitable intervals in the course of generating a number of gears and means combined with other features of a gear shaping machine by which such reversals are effected. It also includes means whereby the direction of backing off of the work from the cutter, or vice versa, may be adjusted and automatically shifted to one side or the other of the line of centers when the directions of rotation are reversed. The conditions under which such changes of direction are required are illustrated by Fig. 14 (Sheet 1). The cutter C in Fig. 14 is represented as rotating clockwise and as operating on a partially cut gear blank W. The form and pitch of the cutter teeth are such that interference with the adjacent uncut part $d$ of the blank would occur if the blank were backed off on the line of centers D—D. To avoid interference then, the backing off is performed in a direction inclined to the line of centers, such as that indicated by the line $g$. Conversely, when the rotation of the cutter is counterclockwise, there would be a corresponding interference at the opposite side of the line of centers, and then the backing off must be in a direction such as that indicated by the line $h$, the inclination of which with the line of centers is opposite to that of the line $g$.

I will now describe the salient features of an organized gear shaping machine provided with means for effecting the reversals previously described.

Figure 13:
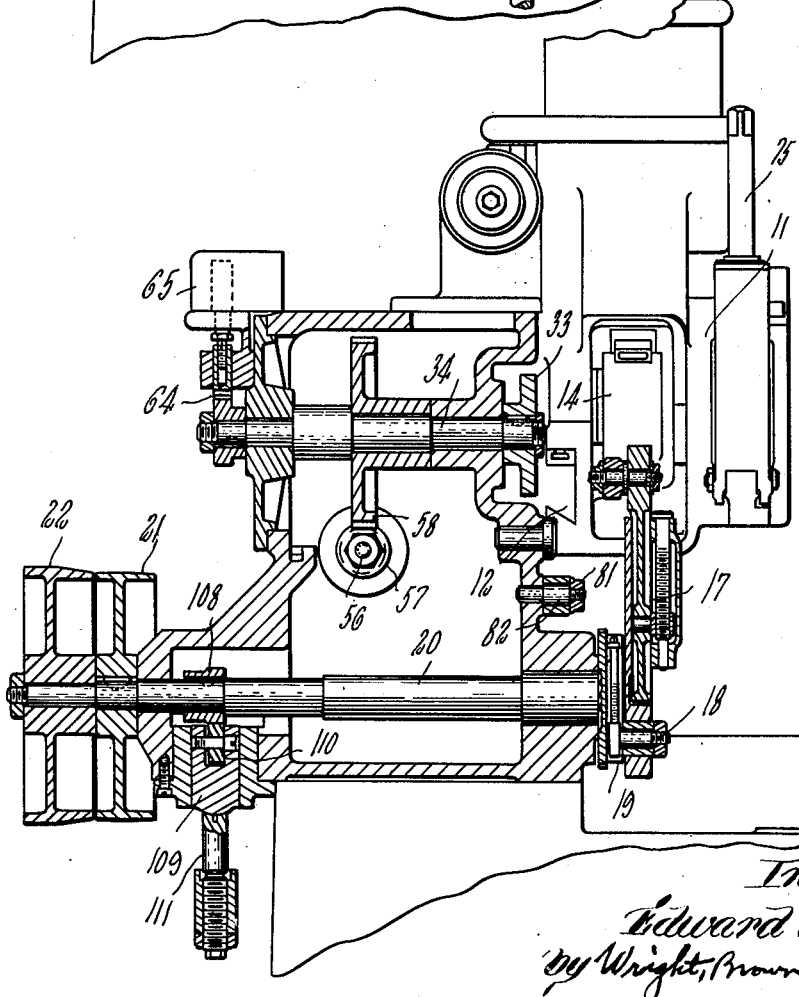
Fig. 13 is a vertical section taken on line 13—13 of Fig. 1 as viewed from the left hand side of that figure.

The cutter C is secured to the lower end of a cutter spindle 10 (Fig. 1) which is reciprocable endwise, and rotatable in a cutter saddle or carriage 11 which is supported to travel on guideways 12, 12 on the supporting structure 13 of the machine. Reciprocation is imparted to the spindle by a lever 14, mounted on a bearing surrounding and coaxial with a shaft 15, and having a gear segment on one arm which meshes with enveloping rack teeth 16 on the spindle. The other arm of lever 14 is coupled by an adjustable connecting rod 17 with a crank pin 18 carried by and radially adjustable on a disk 19 on the forward end of a crank shaft 20 (Figs. 4 and 13). On the rear end of shaft 20 are mounted fast and loose pulleys 21 and 22 adapted to be driven by a belt from an electric motor, a counter shaft, or other suitable source of power. Such a motor may be mounted on any part of the machine, or elsewhere, suitably for driving a belt that can run interchangeably on each of the pulleys 21 and 22. It is not shown in these drawings except in the electrical diagram, Fig. 16, where it is designated by the numeral 23. For the purpose of this description it may be called the main motor.

Figure 7:
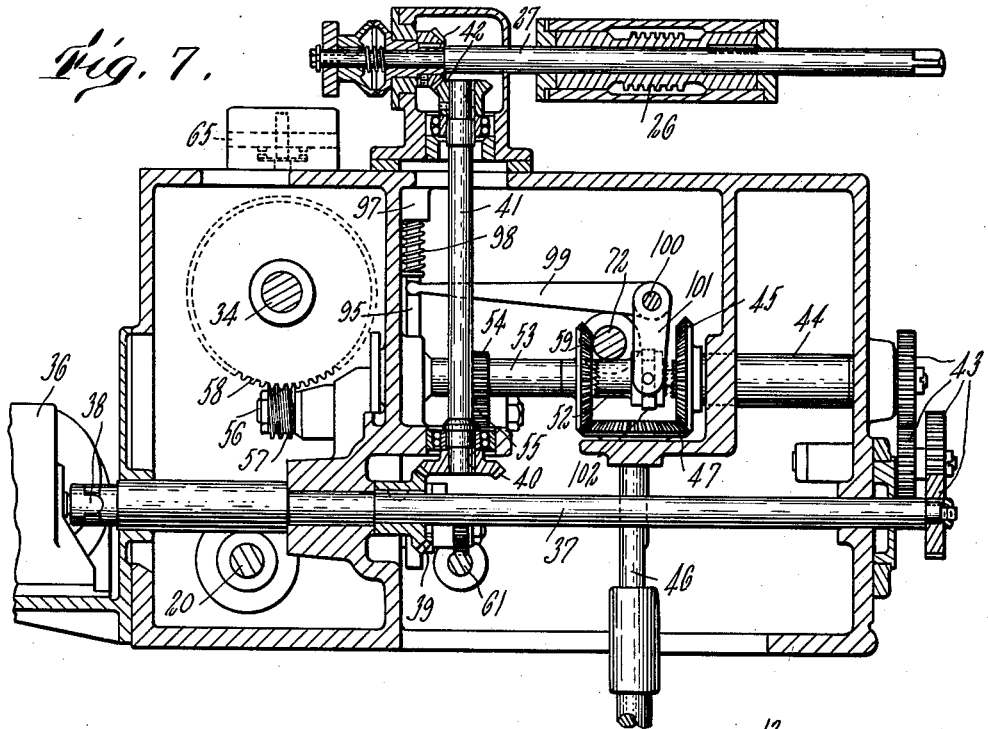
Fig. 7 is a substantially vertical section taken on line 7—7 of Fig. 3.

Rotation is imparted to the cutter spindle 10 by a coaxial worm gear 24 rotatably mounted in bearings in an elevated part of the saddle 11 and with which the spindle has engagement by means of guides in the nature of splines, a part of which is shown at 25 in Fig. 1. The worm gear 24 is driven by a worm 26 (Figs. 7 and 15) keyed to a shaft 27.

The work piece W is mounted on a work spindle 28, which is rotatably mounted in a quill 29 held by an apron 30 and supported on the machine base. A worm gear 31 is secured to the work spindle and is driven by a worm 32.

The guideways 12 permit movement of the cutter saddle 11 toward and away from the work spindle. Advance of the saddle for feeding the cutter to the correct depth and retraction to permit changing of the work pieces are effected by a depth feed cam 33 on a shaft 34, and a weight 35 (Figs. 3 and 4), which are operatively associated with the cutter saddle in a manner later described.

A comprehensive view of the driving connections whereby the spindles and depth feed cam are rotated, is given by the schematic layout in Fig. 15. An electric motor 36, which may be called the feed motor, drives a shaft 37 by means of a coupling 38. Shaft 37 carries a gear 39 which, through mating gear 40, shaft 41 and gear pair 42 drives the worm shaft 27 by which the cutter spindle rotating gear 24 is rotated. Shaft 37 also drives, through a set of changeable gears 43, a shaft 44 on which is mounted a bevel gear 45. A depending shaft 46 carries on its upper end a gear 47 in mesh with gear 45 and on its lower end a bevel gear 48 which is adapted to mate with either of two bevel gears 49 and 50 on the shaft 51 on which the worm 32 is splined for rotating the worm gear 31 of the work spindle. The depth feed cam 33 is driven from shaft 44 through a clutch 52, a shaft 53 to which this clutch is splined, a gear 54 on shaft 53, a gear 55 meshing therewith on a shaft 56, a worm 57 on shaft 56 and worm gear 58 on shaft 34 of the cam.

Figure 9:
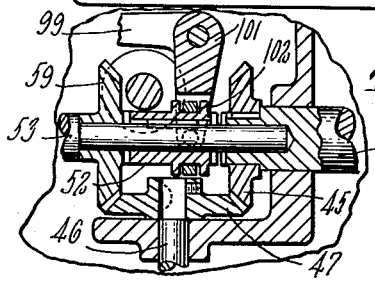
Fig. 9 is a detail sectional view of the reversible gearing shown in Fig. 7, taken on the plane which includes the axes of the several gears.

It is necessary that the depth feed cam rotate always in the same direction. Hence, when the rotation of the cutter and work spindles is reversed, by reversal of the feed motor 36, the drive for the cam must be reversed relative thereto; and for reversing it a bevel gear 59 is mounted free on the shaft 53 and is held in mesh with the bevel gear 47. Being at the opposite side of the axis of gear 47 from gear 45, gear 59 rotates oppositely to the shaft 44. Clutch 52 is a sleeve shiftable endwise on shaft 53 and has clutch teeth on opposite ends capable of being brought into mesh exclusively either with complemental teeth on the end of shaft 44 or teeth on the adjacent face of gear 59. The details of this reversing clutch and gearing are shown in Fig. 9.

Fig. 15 shows also a belt shipper 60 connected with an operating rod 61 and operable thereby to shift the driving belt from either of the tight and loose pulleys 21 and 22 to the other. The shipper 60 carries an adjustable switch actuator 62 in position to operate an electric switch 63; and the depth feed cam shaft 34 carries also a switch cam 64 for controlling an electric switch 65. These switches form part of starting, stopping and reversing means for the feed motor 36 and another motor later described. Cam 64 is constructed to cause closing of switch 65 during only a small fraction of its rotation, and near the end of its rotation.

Figure 8:
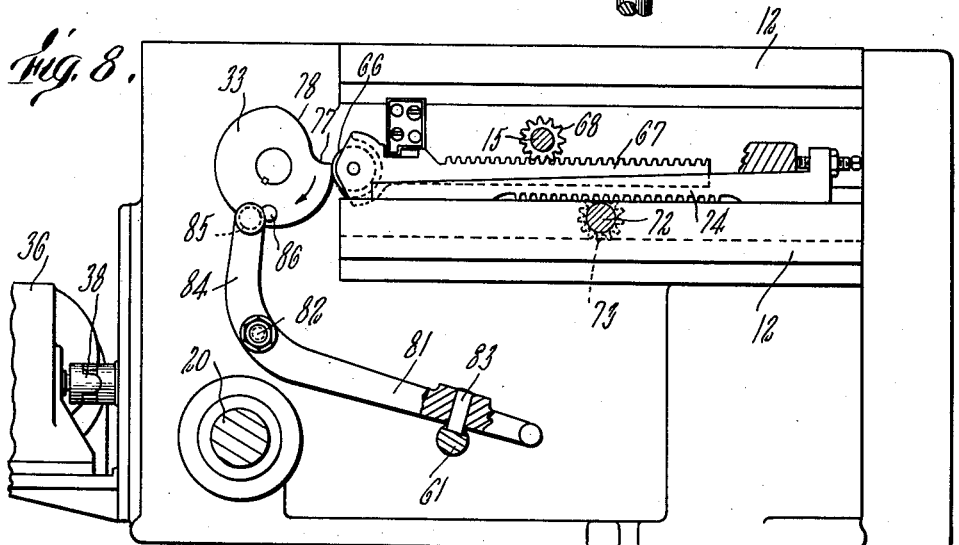
Fig. 8 is a view shown in front elevation of the parts in rear of the line 8—8 on Fig. 3.

The depth feed cam acts on the cutter saddle through a roller 66 (Fig. 8) carried by a rack 67 supported to slide on a part of the guideways 12 and with which the saddle is coupled through a pinion 68 in mesh with the rack and forming an operative part of shaft 15; said shaft being contained rotatably in a sleeve 69 (Fig. 3) mounted in the saddle 11 and on which lever 14 has its bearing. Shaft 15 is normally locked against rotation relative to the saddle and may be manually turned to adjust the position of the saddle and cutter spindle to greater or less distances from the cam. The weight 35 is suspended by a chain 70 which overlies and hangs from a sprocket 71 on a shaft 72 (Fig. 3). Shaft 72 carries a pinion 73 in mesh with a rack 74, which is so connected or engaged with the cutter saddle that the force exerted by the weight holds the cam roll 66 against the depth feed cam and retracts the saddle whenever the cam permits. The parts last described are substantially like corresponding parts shown in the patent of the United States to Fellows No. 1,463,806, dated August 7, 1923, except that a worm carried by an upright shaft 75 and an external gear 76 meshing therewith, keyed to shaft 15, for adjusting the pinion 68, are substituted for the spur pinion and internal gear couple for that purpose shown in said patent.

The depth feed cam has a recess 77 which permits retraction of the cutter from the work, a rise 78 which advances the cutter to the work and feeds it to depth, and a dwell occupying the major part of its circumference, which holds the saddle in place until a series of teeth have been cut.

The shipper rod 61 projects from the front of the machine and carries a handle 79 whereby it may be pulled forward to shift the belt from the loose to the fast pulley. A spring 80 surrounding the rod and reacting between the shipper and an abutment on the machine frame tends to move the shipper backward to place the belt on the loose pulley. A latch lever 81 is pivoted to the machine frame at 82 and carries a latching tongue 83 (Fig. 8) adapted to enter a notch in the side of the shipper rod when the latter is in its forward position. Lever 81 has an arm 84 extending toward the depth feed cam and having a contact surface 85 adjacent to the orbit in which a trip stud 86 on the depth feed travels. When the latch lever is engaged with the shipper rod, the contact surface 85 extends across the path of stud 86 far enough so that the stud, in wiping across it, causes the latching tongue to be withdrawn from the shipper rod. The latch lever is so arranged that gravity causes its latching tongue to rest on the upper side of the shipper rod and to enter the notch therein when the rod is drawn forward.

The control equipment of this machine for the motor 36, and another motor later described, is set into action by the switch 63 every time the shipper rod 61 is pulled forward, and the controls include means for reversing the motors with each actuation. The machine is stopped when the depth feed cam completes a rotation and is organized so that the series of teeth of the work gear is completed within that length of time. Means are provided under control of the belt shipper rod for reversing the drive for the depth feed cam every time the shipper is moved to start the machine, so that the cam will rotate at all times in one and the same direction. Such means comprise a pinion 88 mounted to rotate on a fixed pivot pin 89 (Figs. 4, 5 and 6) in mesh with a series of rack teeth 90 cut in the upper side of the shipper rod 61. An arm 91 connected with this pinion carries a pawl 92 cooperating with a ratchet 93 beside and coaxial with pinion 88. The ratchet has two notches at diametrically opposite points arranged to receive the toe of the pawl and shaped so that the pawl will rotate the ratchet when the shipper rod is pulled forward, and travel free when the rod is retracted. The pinion is designed to be turned through somewhat more than a half revolution, but less than a whole turn, with each movement of the belt shipper. A cam 94 rigidly coupled with the ratchet 93 has a high point at one side of its axis, a low point at the other side, and eccentric intermediate portions. It engages a rod 95 which is slidable in guides 96 and 97, and is held in contact with the cam by a spring 98 (see Fig. 7). Rod 95 is engaged by a fork on a lever arm 99 which is pivoted at 100 and has a forked arm 101 embracing the clutch sleeve 52 in coupled engagement with a ring 102 which is embraced by flanges on the clutch sleeve, as shown by Fig. 9. Thus the clutch sleeve is coupled with the gear 50 after every alternate forward movement of the shipper rod, and with the shaft 44 after each intermediate forward movement, and remains in such coupled engagement each time while the depth feed cam rotates all the way around, since the high and low points of the cam are suitably shaped and arranged for that purpose and the cam remains stationary when the shipper rod is retracted.

Figure 12:
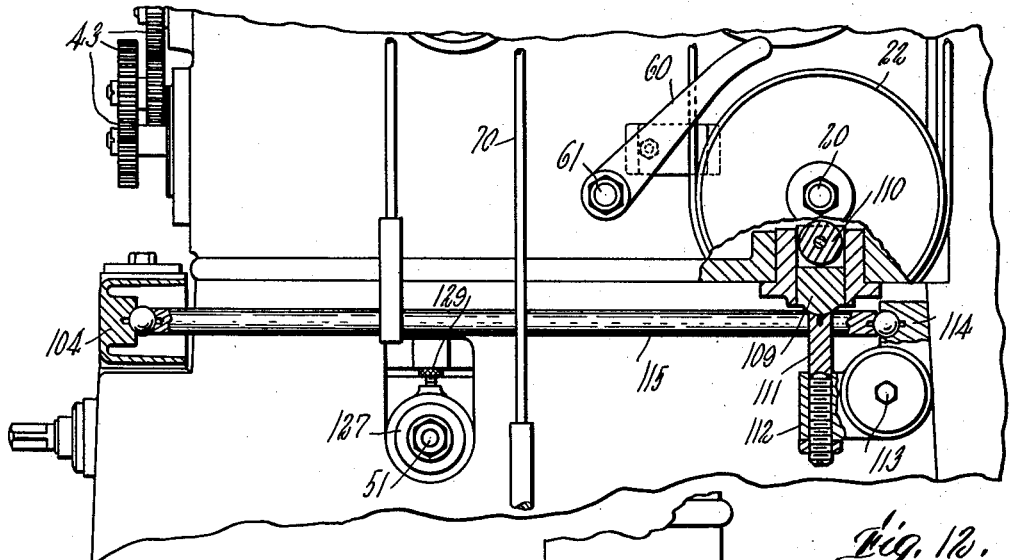
Fig. 12 is a fragmentary rear elevation of the machine with parts shown in section on line 12—12 of Fig. 3.

For backing off the work spindle to prevent rubbing on return strokes of the cutter, and returning the spindle into operative position before the cutting strokes commence, the apron 30 is coupled by a pivot 103 with a lever 104 which is connected by a pivot 105 with the base of the machine structure. A spring 106 reacts between the lever 104 and machine base tending to withdraw the apron and quill from a seat 107 in the machine base (Fig. 1), against which it is held while cutting strokes are made. A system of levers and push rods is interposed between the lever 104 and a cam 108 (Fig. 13) on the crank shaft 20; such system consisting of a plunger 109 having a roller 110 in contact with the cam, a rod 111 engaged by the plunger and bearing on an adjustable abutment in one arm, 112, of a bell crank lever (Fig. 12) pivoted at 113, the arm 114 of which bears on one end of a rod 115, whose other end bears on the lever 104. Spring 106 exerts force holding all of these parts in engagement and eliminating backlash, and the adjustable abutment in arm 112 enables the cam, acting through this transmission system, to hold the quill 29 firmly against the seat 107. The cam has a low dwell and a high dwell, each subtending nearly half its circumference and so disposed that the high dwell causes the spindle quill to bear on seat 107 throughout the whole of each cutting stroke, and the low dwell permits the spring 106 to back off the work spindle at the beginning of each return stroke and hold it clear of the cutter throughout the course of the return strokes.

The work spindle is guided in its backing off and return movements by a guide block 116 (Fig. 4) having a contact surface adjacent to the spindle against which bears a sliding shoe 117 which is seated in a recess 118 in a flange 119 on the quill 29. The guide block 116 is carried by the upper end of a shaft 120 which has a rotative bearing in the machine base, so that the block can be inclined at various angles with respect to the line of centers of the cutter and work spindles, that is, the plane in which the axes of these spindles lie. The outer surface of the shoe 117 is cylindrical and coaxial with the shaft 120 when the work spindle is at one location between the limits of its backing off movement; and, as this movement is very short, the said curved face is substantially coaxial with the shaft in all positions of the spindle. As the recess 118 is complemental to the curved face of the shoe, the latter has a floating engagement with the quill which enables it to adapt itself to all inclinations of the guide block 116. Abutment screws 122 and 123 are mounted in a fixed part of the frame to be engageable with the block 116 at points on opposite sides of the pivotal axis thereof, whereby to adjust the inclination of the block, with or without permitting oscillative movement of the block, and to limit the range of such oscillative movement when permitted. When the abutment screws are in the position shown in Fig. 4, an oscillative movement of the block 116 to equal and opposite angles with the line of centers is permitted.

Automatic angular shifting of the guide block 116 for the purposes explained in connection with the foregoing description of Fig. 14 is accomplished herein by an electric torque motor 124 having a shaft 125, on which is mounted a worm 126 meshing with teeth on the adjacent end of the guide block. This torque motor typifies any means capable of rotating in opposite directions and of exerting constant force on a driven part when such part is blocked. It is correlated with reversing means controlled by the switch 63 so as to be impelled in reversed directions every time the feed motor 36 is reversed and set in action.

This machine is operable for cutting either external or internal gears and for that purpose the shaft 51 which drives the worm 32 for rotating the work spindle is shiftable endwise to put either gear 49 or 50 in mesh with the gear 48 on shaft 46. When gear 49 is in mesh, as shown in Figs. 2 and 3, the work spindle rotates oppositely to the cutter spindle, and when gear 50 is in mesh it rotates in the same direction as the cutter spindle in all reversals. Shaft 51 has a splined engagement with worm 32 and is seated at one end in a bearing block 127, being restrained against endwise movement relative to the bearing block by the gear 50 and a nut on the rear end of the shaft, between which the block is confined.

The bearing block can be moved endwise in the housing 128 and is secured by a screw 129 (the extremity of which enters alternatively either of two sockets in the block), in the positions for meshing the gears 49 and 50 respectively with gear 48 (see Fig. 3).

Housing 128 is swiveled on shaft 46 and a pivot 130 alined with the shaft so that the worm 32 can be shifted out of mesh with worm wheel 31 and adjusted into correct mesh with the wheel. Its outer end rests on an adjustable abutment 131 (Figs. 3 and 11) and it carries a nut 132 at one side into which a screw 133 enters. The head of the screw and a washer 134 bear on the opposite ends of a tube 135, through which the shank of the screw passes, and this tube passes through a stud 136 in screw threaded engagement therewith, whereby it may be adjusted in the directions necessary to move the worm toward and away from the worm wheel.

Figure 16:
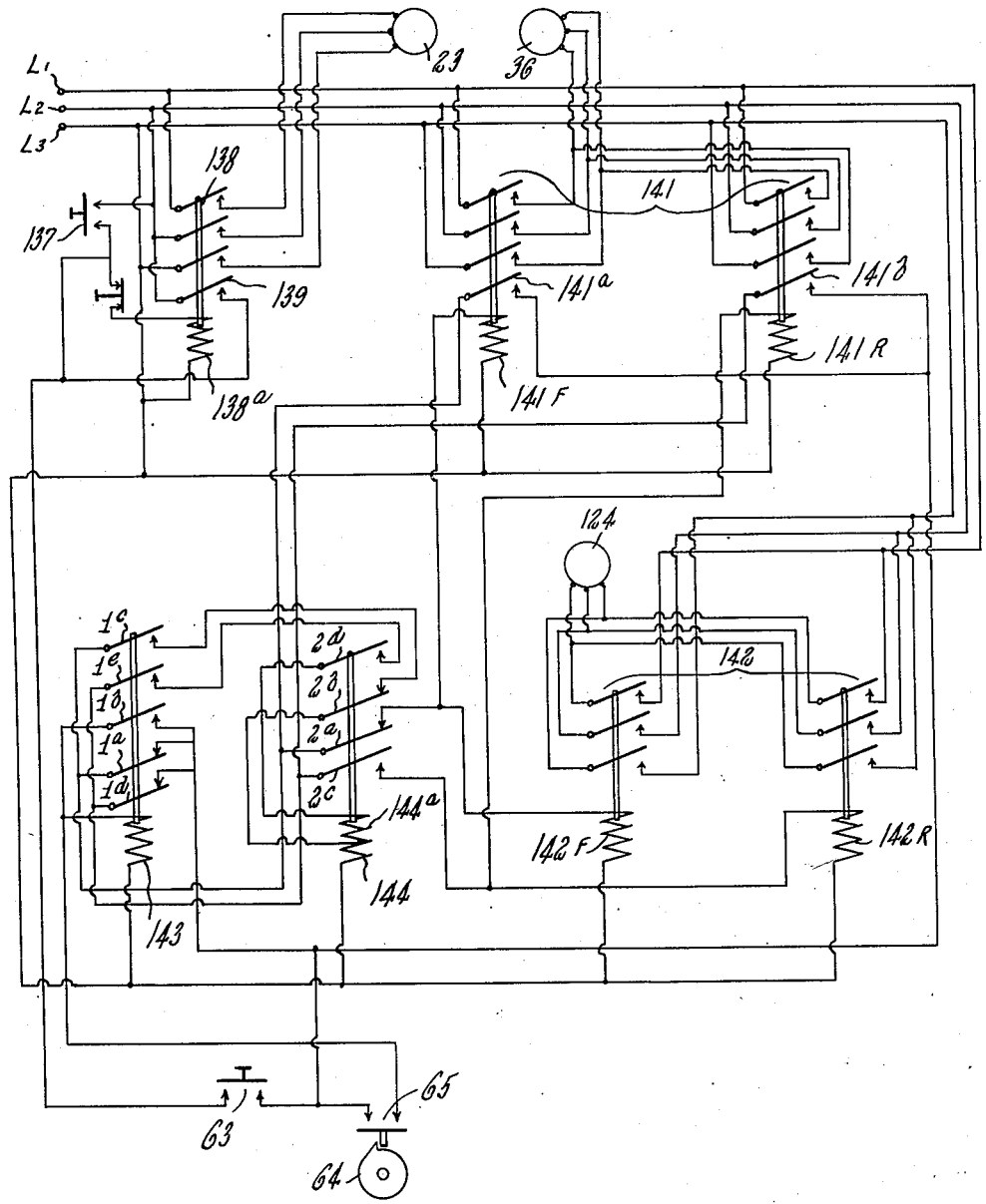
Fig. 16 is a diagram of the electrical controls of the machine.

The mode of operating the machine will be understood from the foregoing description with reference to the electrical diagram (Fig. 16).

The diagram shows a push button starting switch 137 and a starter 138 for the main motor 23 having an actuating coil 138a, including switch contacts by which the motor is connected with the power lines when the coil is energized, and an additional contact 139 for interlocking. There is a normally closed push button stop switch in the circuit of coil 138a.

A starter 141 for the feed motor 36 includes two sets of switch contacts, one of which is arranged for connecting the motor with the power lines for forward running, by an electromagnetic coil 141F when the latter is energized, and the other for connecting the motor to run reversely, by a coil 141R when that coil is energized and coil 141F is deenergized. The forward switch includes a contact 141a for interlocking, which is shifted from open to closed position when the forward switch is closed; and the reversing switch includes a contact 141b for interlocking, which is put in circuit closing position when the reversing switch is closed.

A starter 142 for the torque motor 124 includes forward and reversing switches similar to those of the starter 141, of which the forward starting switch is actuated by a coil 142F and the reversing switch by a coil 142R.

A related set of contacts 1a, 1b, 1c, 1d and 1e are all connected for simultaneous operation by a coil 143. Of these the contacts 1a and 1d are closed and the other three are open (as shown) when coil 143 in deenergized. When coil 143 is energized, these contacts are all put into the opposite condition or phase.

Another set of contacts 2a, 2b, 2c and 2d are connected for simultaneous operation by an electromagnetic coil having two parts designated 144 and 144a. The contacts 2a and 2b are closed, and contacts 2c and 2d are open when the coil is deenergized. When the part 144a of this coil is energized, contacts 2a and 2b are opened and contacts 2c and 2d are closed; and they remain so, due to permanent magnetism of the magnet armature and the frame iron of the switch structure, when the current supply to that part of the coil is broken. Coil parts 144 and 144a are so connected that when current is applied through both parts of the coil, that magnetic effect is overcome and the contacts return by gravity to the positions shown in the diagram. A commercial switching apparatus known as a mechanically-held relay, having the characteristics here described, is used as this part of the equipment.

The switches 63 and 64, previously described, are shown on the diagram in their relation to the other parts.

To start the machine from inactive condition, the push button switch 137 is momentarily closed (stop switch 140 being normally closed.) Coil 138a is then energized and closes the switch contacts of starter 138 to set the main motor 23 in operation. It also closes the contact 139 to establish a shunt circuit around the switch 137 so that the coil will continue operative after the push button has been released. Thereafter, the following steps of operation occur in the course of cutting two gears in succession.

1. The shipper rod 61 is pulled forward to shift the driving belt from the loose pulley 22 to the fast pulley 21, causing the crank shaft 20 to rotate, and at the same time closing switch 63. Current then flows through the closed contacts 1a and 2a to the coil 141F, whereby the feed motor 36 is started to cause the work and cutter to revolve in what may be called, for the purposes of this description, their forward directions of rotation by closing of the switch contacts previously referred to as the forward contacts of starter 141. At the same time the contact 141a is closed, which establishes a shunt circuit around the contact 1a. The coil 142F is in circuit connection with switch contact 2a, and is then energized to actuate one of the sets of contacts of starter 142 and put the torque motor 124 into action for placing the back-off block 116 into correct position corresponding to the direction of rotation of the cutter and work.

2. When the work piece is finished, the depth feed cam 33 and control cam 64 have nearly completed a revolution and cam 64 has reached the position in which it briefly closes the contacts of switch 65 before the machine stops. Closing of switch 65 causes coil 143 to be energized and all the contacts which it controls to be shifted to the opposite positions from those shown in the diagram. Contact 1b is closed, establishing a shunt circuit around switch 65 through coil 143, whereby the coil remains energized after switch 65 has opened. Closing of contact 1c at the same time provides a current path through the previously closed contacts 141a and 2b to the coil part 144, whereby contact 2a is shifted to open the circuits of the coils 141F and 142F. This stops the feed motor 36 and removes power from the torque motor 124. At the same time contact 2b is opened and contacts 2c and 2d are closed. Although contact 2b is then open, all these contacts remain magnetically latched by the permanent magnetism of the structure in the positions to which they were shifted when coil part 144 was energized.

3. The final part of the rotation of cam 64 releases switch 65, whereby the latter automatically opens.

4. At the end of the rotation of the depth feed cam, its trip stud operates latch lever 81 to release the shipper rod 61, whereby the contact 63 is opened, and all moving parts of the machine except the main motor 23 come to rest, and the coil 143 is deenergized, causing the contacts 1a, 1d to return to the positions shown in the diagram. The contacts 2a—2d, however, remain in the positions opposite to those shown.

5. For cutting the next gear, with rotation of the cutter and work in the opposite direction, the shipper rod is again pulled forward and switch 63 closed. Current then flows through the closed contacts 1d, 2c and the reversing coils 141R and 142R. Coil 141R closes the reversing switch contacts of the feed motor starter 141, whereby the cutter and work are rotated in the reverse direction, and contact 141b is closed. Coil 142R closes the reversing switch contacts of the torque motor starter 142 and causes the torque motor 124 to shift the guide block 116 to the opposite inclination.

6. The machine continues in operation until the gear then on the work spindle is completed and switch 65 is again closed by cam 64. At this time the coil 143 is energized and shifts contacts 1a—1d to the opposite positions from those shown in the diagram, as first described. Current flows through the now closed contacts 141b, 1e and 2d to energize the entire coil 144 and 144a, whereby the contacts 2a—2d return to the positions shown in the diagram, and the coils 141R and 142R are deenergized so that the contacts of starters 141 and 142 are opened, and power is removed from the feed motor 36 and torque motor 124.

7. The depth feed cam 33 and switch cam 64 kick forward to open the switch 65.

8. The shipper rod is shifted to stop the rotation of crank shaft 20 and open switch 63.

Further operations of the shipper rod cause the actions herein described to be repeated; alternate operations causing the feed and torque motors to be driven in the so called forward direction, and the intermediate operations causing these motors to be driven in the so called reverse direction.

It is to be understood that many variations from the specific machine and parts thereof may be made without departing from the spirit and scope of the invention, and all such variations within the broad ambit of the principles embodied herein are embraced within the scope of the protection claimed.

What I claim as my original and novel invention is:

1. A gear generating machine including a gear shaped planing cutter having cutting edges at one end, a rotatable cutter spindle on which said cutter is mounted, a rotatable work spindle adapted to carry a gear blank, one of said spindles being movable endwise reciprocably, mechanism for so reciprocating the endwise movable spindle, reversible driving means coupled with the spindles organized to rotate them simultaneously, control means for starting and stopping the action of said driving means, and means controlled by said control means for reversing the driving means whenever said control means is operated to start the driving means.

2. A gear generating machine comprising a cutter spindle and a work spindle, one of which is reciprocable endwise, a gear shaped planing cutter having teeth with cutting edges on one end, secured to the cutter spindle, one of the spindles being movable toward and away from the other for alternately effecting a backing off movement between a work piece and the cutter and bringing them into cutting relation, a guide arranged for controlling the direction of backing off and return movements, adapted to be set at different inclinations to a plane including the cutter spindle axis and the pitch point of the cutter with a work piece on the work spindle, reversible driving means for rotating said spindles simultaneously in harmony, means for shifting said guide, and control means for starting said driving means, said control means including means for reversing the driving means and causing the guide shifting means to be actuated whenever said driving means is put into action.

3. In a gear generating machine of the shaper type having cutter and work spindles and a gear shaped planing cutter carried by the cutter spindle, a reversible motor in driving connection with both spindles for rotating them when set into operation, a controller operable to start said motor and means operated by said controller for causing the directions of rotation imparted by the motor to the spindle to be reversed.

4. A gear generating machine comprising a supporting structure, cutter and work spindles mounted rotatably and one of them being reciprocable endwise, a gear shaped cutter having cutting edges at one end of its teeth secured to the cutter spindle, means for reciprocating one of said spindles, means for moving one of said spindles away from and toward the other in time with reciprocations of the reciprocable spindle to bring the cutter and a work piece in cutting relation when cutting strokes are made and into a backed off relation for return strokes, a guide disposed to control the direction of such backing off movement and being angularly adjustable to alter such direction, reversible driving means for rotating said spindles simultaneously, reversible guide actuating means connected with said guide to shift the position of the guide angularly when actuated in opposite directions, and means for causing simultaneous reversals of said driving means and guide actuating means.

5. A gear generating machine comprising a supporting structure, cutter and work spindles mounted rotatably and one of them being reciprocable endwise, a gear shaped cutter having cutting edges at one end of its teeth secured to the cutter spindle, means for reciprocating one of said spindles, means for moving one of said spindles away from and toward the other in time with reciprocations of the reciprocable spindle to bring the cutter and a work piece in cutting relation when cutting strokes are made and into a backed off relation for return strokes, a carriage on which the other spindle is mounted movable to effect separation and approach between the spindles for depth feeding, a depth feed cam formed and disposed to control movement of said carriage, a reversible driving means for rotating the spindles simultaneously, reversible transmission connections between said driving means and the depth feed cam for propelling the latter, a controller for reversing said driving means, and means actuable by said controller for reversing the action of said cam propelling connections at the same time.

6. A gear generating machine comprising a supporting structure, cutter and work spindles mounted rotatably and one of them being reciprocable endwise, a gear shaped cutter having cutting edges at one end of its teeth secured to the cutter spindle, means for reciprocating one of said spindles, means for moving one of said spindles away from and toward the other in time with reciprocations of the reciprocable spindle to bring the cutter and a work piece in cutting relation when cutting strokes are made and into a backed off relation for return strokes, a carriage on which the other spindle is mounted movable to effect separation and approach between the spindles for depth feeding, a depth feed cam formed and disposed to control movements of said carriage, a reversible driving means for rotating the spindles simultaneously, reversible transmission connections between said driving means and the depth feed cam for propelling the latter, a controller for reversing said driving means, means actuable by said controller for reversing the action of said cam operating means at the same time, a guide arranged to control the direction of backing off movement between the spindles and being shiftable to alter such direction, reversible impelling means coupled with the guide for angularly moving the latter in one direction or the opposite direction when reversed, and means controlled by said actuator for reversing said impelling means when the driving means is reversed.

7. A gear shaping machine comprising a supporting structure, a cutter spindle and work spindle mounted rotatably on said supporting structure and one of said spindles being reciprocable endwise, a gear shaped planing cutter having cutting edges on one end of its teeth mounted on the cutter spindle adapted to cut tooth spaces in a work piece mounted on the work spindle, motive means in driving connection with said reciprocable spindle for imparting reciprocating movements thereto, a controller operable to start and stop the reciprocating movement of said spindle, a reversible motor in geared connection with both spindles for rotating them simultaneously, and means operated by said controller for causing said driving means to run alternately in opposite directions when the actuator is successively operated to start and stop the reciprocating movements of the reciprocable spindle.

8. A gear shaping machine comprising a supporting structure, a cutter spindle and a work spindle mounted rotatably on said supporting structure and one of said spindles being reciprocable endwise, a gear shaped planing cutter having cutting edges on one end of its teeth mounted on the cutter spindle adapted to cut tooth spaces in a work piece mounted on the work spindle, motive means in driving connection with said reciprocable spindle for imparting reciprocating movements thereto, a controller operable to start and stop the reciprocating movement of said spindle, a reversible motor in geared connection with both spindles for rotating them simultaneously, a carriage on which one of the spindles is mounted movable to alter the distance between the spindles for depth feeding and to permit changing of work pieces on the work spindle, a depth feed cam operatively associated with said carriage for controlling the movements thereof, reversible transmission mechanism between said driving means and depth feed cam for rotating the cam, means controlled by said controller for causing the driving means to run in alternately opposite directions with successive operations of the actuator to cause reciprocating movement of the reciprocable spindle, and means operable by the controller at the same times for reversing the transmission mechanism by which the depth feed cam is driven.

9. A gear generating machine comprising a supporting structure, cutter and work spindles mounted rotatably on the supporting structure, one of said spindles being reciprocable endwise, a gear shaped planing cutter secured to the cutter spindle, an apron in which one of the spindles is mounted movable on the supporting structure to impart backing off and return movements to the spindle which it carries relative to the other spindle, a guide located beside the apron in engagement therewith for controlling the direction of such backing off and return movements and being angularly shiftable to vary that direction, adjustable stops associated with said guide to establish limits to its angular movements in opposite directions, a reversible electric torque motor coupled with said guide to shift the latter to one or the other of such limits and hold it in contact with one or the other of said stops when oppositely actuated, an electric driving motor in driving connection with said spindles for rotating both simultaneously, and control means operable to reverse the action of said torque motor and driving motor simultaneously.

EDWARD W. MILLER.

References Cited in the file of this patent

UNITED STATES PATENTS

| Number | Name | Date |
|---|---|---|
| 1,862,202 | Simmons | June 7, 1932 |
| 2,266,889 | Miller et al. | Dec. 23, 1941 |